(12) United States Patent
Hayashi et al.

(10) Patent No.: US 11,010,624 B2
(45) Date of Patent: May 18, 2021

(54) TRAFFIC SIGNAL RECOGNITION DEVICE AND AUTONOMOUS DRIVING SYSTEM

(71) Applicant: TOYOTA JIDOSHA KABUSHIKI KAISHA, Toyota (JP)

(72) Inventors: Yusuke Hayashi, Susono (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 262 days.

(21) Appl. No.: 16/223,214

(22) Filed: Dec. 18, 2018

(65) Prior Publication Data
US 2020/0026935 A1 Jan. 23, 2020

(30) Foreign Application Priority Data

Jan. 11, 2018 (JP) ................................. 2018-002520

(51) Int. Cl.
*G06K 9/00* (2006.01)
*G05D 1/02* (2020.01)
*G05D 1/00* (2006.01)

(52) U.S. Cl.
CPC ....... *G06K 9/00818* (2013.01); *G05D 1/0088* (2013.01); *G05D 1/0246* (2013.01); *G06K 9/00825* (2013.01); *G05D 2201/0213* (2013.01)

(58) Field of Classification Search
CPC ........... G06K 9/00818; G06K 9/00825; G06K 9/00805; G06K 9/00798; G06K 9/00791; G06K 9/00785; G05D 1/0088; G05D 1/0038; G05D 1/0238; G05D 1/0246; G05D 2201/0213; G05D 2201/0212; G08G 1/00

USPC ........ 382/100, 103–104, 155, 159, 170, 181
See application file for complete search history.

(56) References Cited

U.S. PATENT DOCUMENTS

2007/0290886 A1* 12/2007 Stam ........................ B60Q 9/00
340/907
2012/0310466 A1 12/2012 Fairfield et al.
2014/0303829 A1 10/2014 Lombrozo et al.
(Continued)

FOREIGN PATENT DOCUMENTS

EP 3147884 A1 * 3/2017 ......... G06K 9/00798
EP 3168823 A1 * 5/2017 ............ G01C 21/26
JP 2014-180986 A 9/2014
(Continued)

*Primary Examiner* — Dwayne D Bost
*Assistant Examiner* — Stephen M Brinich
(74) *Attorney, Agent, or Firm* — Sughrue Mion, PLLC

(57) ABSTRACT

The traffic signal recognition device includes a traffic signal recognition unit configured to perform processing for recognizing the traffic signal based on the result of imaging performed by a camera, an external situation recognition unit configured to recognize a size and position of a surrounding vehicle, and a occluded situation determination unit configured to determine whether or not the area in front of a host vehicle is in the traffic signal occluded situation, in which the line of sight from the camera to the traffic signal is blocked by the surrounding vehicle. The traffic signal recognition unit is configured not to perform the processing for recognizing the traffic signal within a difficulty zone and not to perform the processing for recognizing the traffic signal if it is determined that the area in front of the host vehicle is in the traffic signal occluded situation.

6 Claims, 9 Drawing Sheets

(56) References Cited

U.S. PATENT DOCUMENTS

2015/0291093 A1* 10/2015 Iwai .................. G06K 9/00845
340/995.27
2018/0012088 A1   1/2018 Matsuo et al.

FOREIGN PATENT DOCUMENTS

| JP | 2016-042226 A | 3/2016 |
| JP | 2017-045272 A | 3/2017 |
| JP | 2017-182297 A | 10/2017 |
| WO | 2016/006029 A1 | 1/2016 |

* cited by examiner

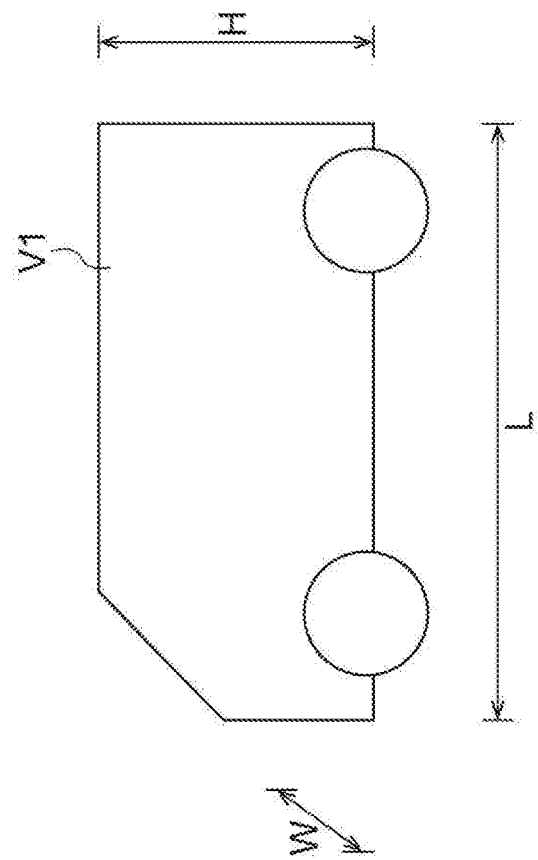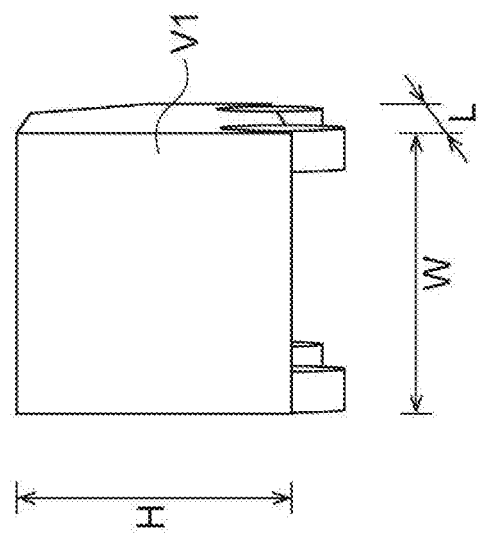

TRAFFIC SIGNAL RECOGNITION DEVICE AND AUTONOMOUS DRIVING SYSTEM

CROSS-REFERENCE TO RELATED APPLICATION

This application claims the benefit of priority from Japanese Patent Application No. 2018-002520, filed on Jan. 11, 2018, the entire contents of which are incorporated herein by reference.

TECHNICAL FIELD

The present disclosure relates to a traffic signal recognition device and an autonomous driving system that includes the traffic signal recognition device.

BACKGROUND

For example, Japanese Unexamined Patent Publication No. 2016-042226 discloses a traffic signal recognition device that recognizes traffic signals in front of a host vehicle. The traffic signal recognition device recognizes a position of the host vehicle, an installed position of the traffic signal included in map information, and the traffic signal based on a result of imaging performed by an imaging unit.

SUMMARY

For example, there is a case where it is difficult to recognize a traffic signal from a host vehicle, such as a case where a traffic signal is hidden by a tree existing in the vicinity of the traffic signal. In such a case, even if the traffic signal recognition device performs processing for recognizing the traffic signal, the traffic signal cannot be recognized. Therefore, in this technical field, it is desired to efficiently perform the processing for recognizing the traffic signal.

In the present disclosure, there is provided a traffic signal recognition device that is configured to recognize a traffic signal in front of a host vehicle. The device includes a map storage unit configured to store map information including an installed position of the traffic signal and information on a position of a difficulty zone where it is difficult to recognize the traffic signal seen from a traveling lane, a vehicle position recognition unit configured to recognize a position of the host vehicle on the map, an imaging unit configured to image the front of the host vehicle, a traffic signal recognition unit configured to perform the processing for recognizing the traffic signal based on a result of imaging performed by the imaging unit, a surrounding vehicle recognition unit configured to recognize a size of a surrounding vehicle at the surroundings of the host vehicle and a position relative to the host vehicle, and a occluded situation determination unit configured to determine whether or not an area in front of the host vehicle is in a traffic signal occluded situation in which a line of sight from the imaging unit to the traffic signal is blocked by the surrounding vehicle when the host vehicle travels in the area. The occluded situation determination unit is configured to predict whether or not the line of sight from the imaging unit to the traffic signal is blocked by the surrounding vehicle when the host vehicle travels in the area in front of the host vehicle, based on the installed position of the traffic signal and the size and position of the surrounding vehicle recognized by the surrounding vehicle recognition unit, and determine whether or not the area in front of the host vehicle is in the traffic signal occluded situation based on the result of prediction. The traffic signal recognition unit is configured not to perform the processing for recognizing the traffic signal if the position of the host vehicle recognized by the vehicle position recognition unit is within the difficulty zone, and not to perform the processing for recognizing the traffic signal if it is determined by the occluded situation determination unit that the area in front of the host vehicle is in the traffic signal occluded situation. As a result, the traffic signal recognition device can efficiently perform the processing for recognizing the traffic signal.

The traffic signal recognition device further includes a recognition zone setting unit configured to set a recognition zone on which processing for recognizing the traffic signal is to be performed, at a position in front of the traffic signal in the traveling lane. The traffic signal recognition unit is configured to perform the processing for recognizing the traffic signal if the position of the host vehicle 1.5 recognized by the vehicle position recognition unit is within the recognition zone. The occluded situation determination unit is configured to determine whether or not a zone other than the difficulty zone in the recognition zone is in the traffic signal occluded situation. The traffic signal recognition unit is further configured not to perform the processing for recognizing the traffic signal within the difficulty zone in the recognition zone, and not to perform the processing for recognizing the traffic signal within the zone other than the difficult zone in the recognition zone if it is determined by the occluded situation determination unit that the zone other than the difficulty zone is in the traffic signal occluded situation. In the traffic signal recognition device, the traffic signal recognition unit performs the processing for recognizing the traffic signal in the zone excluding the difficulty zone from the recognition zone using the difficulty zone included in the map information. Therefore, the traffic signal recognition device can firstly perform the processing for recognizing the traffic signal in a zone excluding a zone where it is difficult to recognize the traffic signal based on the difficulty zone included in the map information. In addition, when performing the processing for recognizing the traffic signal within the zone excluding the difficulty zone from the recognition zone, if it is determined that the remaining recognition zone is in the traffic signal occluded situation in which the traffic signal cannot be recognized because the traffic signal is blocked by the surrounding vehicle, the traffic signal recognition unit does not perform the processing for recognizing the traffic signal within the remaining recognition zone. As a result, the traffic signal recognition device can efficiently perform the processing for recognizing the traffic signal in the recognition zone.

In the present disclosure, there is provided an autonomous driving system that is configured to perform an autonomous driving control of a host vehicle. The system includes the traffic signal recognition device, a travel plan generation unit configured to generate a travel plan in the autonomous driving control; and a vehicle control unit configured to perform the autonomous driving control of the host vehicle based on the travel plan. The occluded situation determination unit is configured to predict whether or not the line of sight from the imaging unit to the traffic signal is blocked by the surrounding vehicle if the host vehicle travels based on the travel plan. The travel plan generation unit is configured to generate a new travel plan in which the area front of the vehicle is not determined to be in the traffic signal occluded situation by the occluded situation determination unit if it is determined by the occluded situation determination unit that the area in front of the vehicle is in the traffic signal occluded situation.

The autonomous driving system can efficiently perform the processing for recognizing the traffic signal by being provided with the traffic signal recognition device. In addition, by generating a new travel plan when it is determined that the area in front of the vehicle is in the traffic signal occluded situation, the autonomous driving system can increase the possibility of recognizing the traffic signal performed by the imaging unit.

The autonomous driving system may further include a notification unit configured to perform notification of a fact that the travel plan generation unit starts to generate the new travel plan. In this case, the occupants of the host vehicle can recognize that there is a possibility that the travel plan may be changed.

According to various disclosures, the processing for recognizing the traffic signal can be efficiently performed.

BRIEF DESCRIPTION OF THE DRAWINGS

FIG. 2A is a diagram illustrating a captured image of a surrounding vehicle in front of the host vehicle captured by a camera.

FIG. 2B is a diagram illustrating a captured image of a surrounding vehicle in front of the host vehicle captured by a camera.

DETAILED DESCRIPTION

Figure 1:
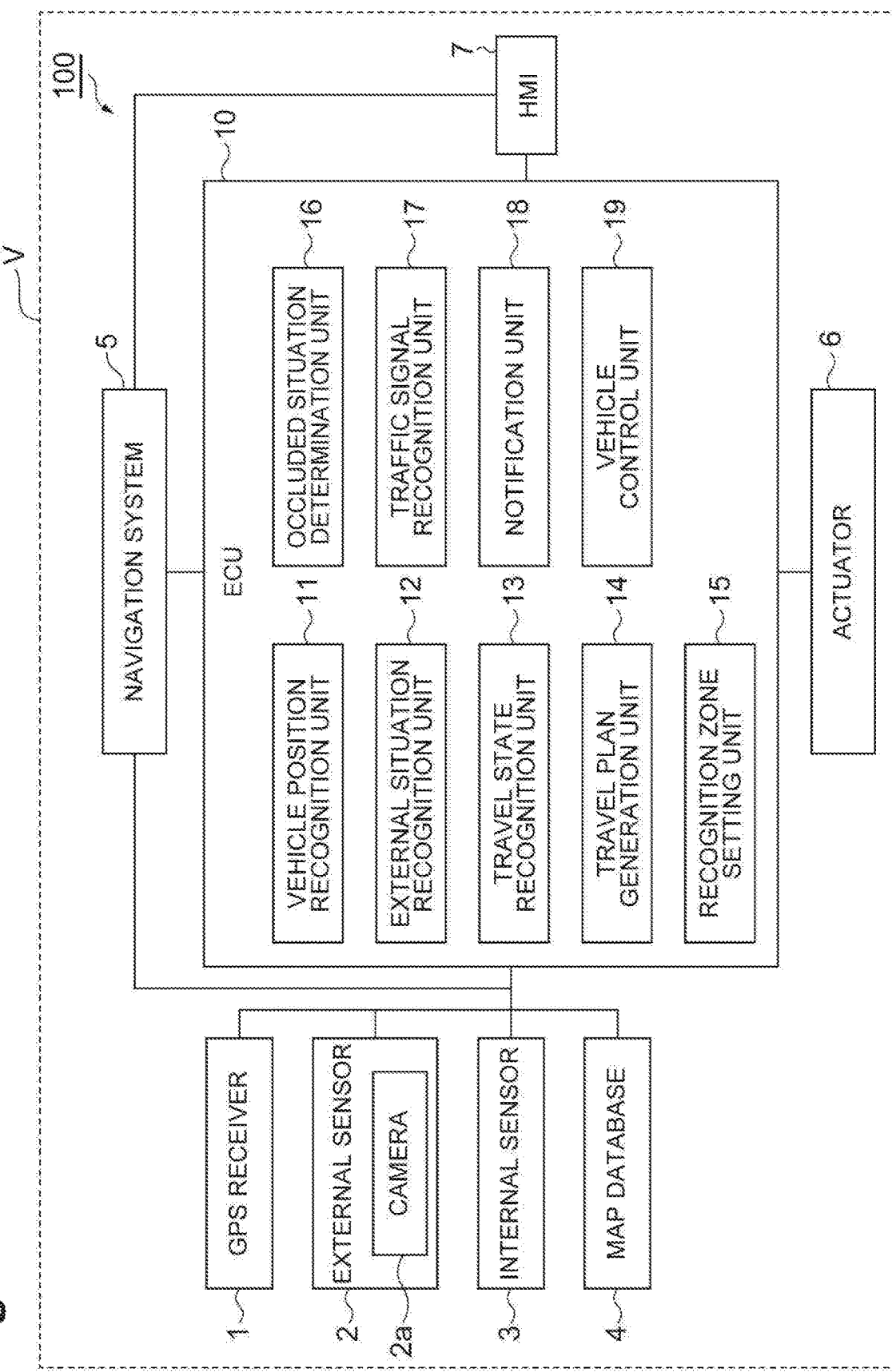
FIG. 1 is a diagram illustrating a schematic configuration of an autonomous driving system in an embodiment.

Hereinafter, embodiments of the present disclosure will be described with reference to the drawings. In the description of the drawings, the same reference numerals are given to the same elements, and the descriptions thereof will not be repeated.

An autonomous driving system 100 illustrated in FIG. 1 is mounted on a host vehicle V such as a passenger car, and performs autonomous driving control of the host vehicle V. The autonomous driving system 100 starts the autonomous driving control of the host vehicle V when the start operation of the autonomous driving control (pressing the start button of the automatic operation) is performed by the occupants.

The autonomous driving control means a vehicle control that causes the host vehicle V to autonomously travel toward a destination set in advance. In the autonomous driving control, a driver does not need to perform a driving operation, and the host vehicle V autonomously travels.

As illustrated in FIG. 1, the autonomous driving system 100 includes an electronic control unit (ECU) 10 that performs an overall management of the system. The ECU 10 is an electronic control unit including a central processing unit (CPU), read only memory (ROM), random access memory (RAM) and the like. In the ECU 10, for example, various functions are realized by loading a program stored in the ROM into the RAM and executing the program loaded in the RAM by the CPU. The ECU 10 may be configured with a plurality of electronic units.

A GPS receiver 1, an external sensor 2, an internal sensor 3, a map database (map storage unit) 4, a navigation system 5, an actuator 6, and a human machine interface (HMI) 7 are connected to the ECU 10.

The GPS receiver 1 measures a position of the host vehicle V (for example, latitude and longitude of the host vehicle V) by receiving signals from equal to or more than three GPS satellites. The GPS receiver 1 transmits information on the measured position of the host vehicle V to the ECU 10.

The external sensor 2 is a detection device that detects a surrounding environment of the host vehicle V. The external sensor 2 includes a camera (an imaging unit) 2a that recognizes traffic signals. The external sensor 2 may include other sensors such as a radar sensor in addition to the camera 2a. The camera 2a is an imaging device that images the surroundings of the host vehicle V in addition to the traffic signals in front of the host vehicle V. The camera 2a transmits the image information (information on the captured image) on the surroundings of the host vehicle V to the ECU 10. The camera 2a may be a monocular camera or may be a stereo camera. The stereo camera has two imaging units that are arranged so as to reproduce a binocular parallax. The image information by the stereo camera also includes information in the depth direction.

The radar sensor is a detection device that detects obstacles around the host vehicle V using radio waves (for example, millimeter waves) or light. The radar sensor includes, for example, millimeter wave radar or a light detection and ranging (LIDAR). The radar sensor transmits the radio wave or light to the surroundings of the host vehicle V, and detects the obstacles by receiving radio waves or light reflected from the obstacles. The radar sensor transmits the detected obstacle information to the ECU 10.

The internal sensor 3 is a detection device that detects a travel state of the host vehicle V. The internal sensor 3 includes a vehicle speed sensor, an accelerator sensor, and a yaw rate sensor. The vehicle speed sensor is a measurement device that measures a speed of the host vehicle V. As the vehicle speed sensor, for example, a vehicle wheel speed sensor is used, which is provided on vehicle wheels of the host vehicle V or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measurement device that measures an acceleration of the host vehicle V. The accelerator sensor may include, for example, a longitudinal accelerator sensor that measures acceleration in the longitudinal direction of the host vehicle V and a lateral accelerator sensor that measures a lateral acceleration of the host vehicle V. The accelerator sensor transmits, for example, acceleration information of the host vehicle V to the ECU 10. The yaw rate sensor is a measurement device that measures a yaw rate (rotation angular velocity) around the vertical axis at the center of gravity of the host vehicle V. As the yaw rate sensor, for example, a Gyro sensor can be used. The yaw rate sensor transmits the measured yaw rate information of the host vehicle V to the ECU 10.

The map database is a database that stores the map information. The map database 4 is formed, for example, in a hard disk drive (HDD) mounted on the vehicle. The map information includes information on the position of the road, information on the shape of the road (for example, types of curves or straight roads, a curvature of the curve, or the like), information on the position of the intersection and the branch, a vehicle speed limit set on the road, and information on the position of a building. The map database may be stored in a computer in a facility such as an information processing center that can communicate with the vehicle.

The map information includes information on the position where the traffic signals are installed. A height position of a light emitting portion of the traffic signal (the portion where the light emitting body such as a bulb is provided) is included in the information on the position where the traffic signals are installed. Information on the position of a stop line installed in front of the traffic signal is included in the map information.

The map information further includes information on the position of a difficulty zone where it is difficult to recognize the traffic signal (light emitting portion) seen from the traveling lane. For example, the difficulty zone may be a region where it is difficult to recognize the light emitting portion of the traffic signal because of the blocking by branches of a tree, signboards, signs, or road structures existing in the vicinity of the traffic signal. For example, the difficulty zone may be a region where it is difficult to recognize the light emitting portion of the traffic signal from the image captured by the camera 2a because the image captured by the camera 2a is overexposed due to backlight. For example, the difficulty zone may be a region where the light emitting portion of the traffic signal cannot be recognized due to road gradients. For example, the difficulty zone may be a region where it is difficult to recognize which light emitting body is emitting because all the light emitting bodies of the light emitting portion of the traffic signal in the image captured by the camera 2a seem to be lit due to forward light. The information on the position of the difficulty zone, where it is difficult to recognize the light emitting portion of the traffic signal due to the backlight and the forward light may be associated with time information on the backlight or the forward light. For example, the difficulty zone may be a region where the sunlight is blocked and darkened due to high buildings in the surroundings, which makes it difficult to recognize the light emitting portion of the traffic signal. In addition, if a visual limiter is provided in the light emitting portion of the traffic signal, it is not possible to recognize the light emission of the light emitting portion of the traffic signal only from a specific position. If such a traffic signal is installed, for example, a region other than a specific position where the light emitting portion of the traffic signal can be recognized may be set as a difficulty zone in the vicinity of the traffic signal.

The navigation system 5 is a system that guides the driver of the host vehicle V to the destination set in advance. The navigation system 5 generates a route from the current position of the host vehicle V to the destination based on the position of the host vehicle V measured by the GPS receiver 1 and the map information in the map database 4. The navigation system 5 performs a route guidance for the driver using an image display and a voice output through the HMI 7 described later. The navigation system 5 transmits information on the destination of the host vehicle V and the route of the host vehicle V to the ECU 10. The autonomous driving system 100 does not necessarily need to include the navigation system 5. The route of the host vehicle V may be generated by the ECU 10. The destination may be set by the occupants, or may be automatically set by the navigation system 5 using a well-known method.

The actuator 6 is a device used for controlling the host vehicle V. The actuator 6 includes at least one of a drive actuator, a brake actuator, and a steering actuator. The drive actuator controls a driving three of the host vehicle V by controlling an amount of air (throttle opening degree) supplied to the engine according to a control signal from the ECU 10. If the host vehicle V is a hybrid vehicle, in addition to the amount of air supplied to the engine, the control signal from the ECU 10 is input to a motor as a power source, and then, the driving force is controlled. If the host vehicle V is an electric vehicle, the control signal from the ECU 10 is input to a motor as a power source, and then, the driving force is controlled. The motor as the power source in these cases configures the actuator 6.

The brake actuator controls the brake system according to control signal from the ECU 10 and controls a braking force applied to the wheels of the host vehicle V. For example, a hydraulic brake system can be used as the brake system. The steering actuator controls the driving of an assist motor controlling a steering torque of an electric power steering system according to a control signal from the ECU 10. In this way, the steering actuator controls the steering torque of the host vehicle V.

The HMI 7 is an interface that performs inputting and outputting of the information between the autonomous driving system 100 and the occupants of the host vehicle. The HMI 7 includes, for example, a display, a speaker, and the like. The HMI 7 outputs an image on the display and outputs a voice from the speaker according to a control signal from the ECU 10. In addition, the HMI 7 includes input portions for the occupants to perform input operations, such as input buttons, touch panels, and voice input devices.

Next, a functional configuration of the ECU 10 will be described. The ECU 10 includes a vehicle position recognition unit 11, an external situation recognition unit (a surrounding vehicle recognition unit) 12, a travel state recognition unit 13, a travel plan generation unit 14, a recognition zone setting unit 15, a occluded situation determination unit 16, a traffic signal recognition unit 17, a notification unit 18, and a vehicle control unit 19. Some of the functions of the ECU 10 may be performed by a server capable of communicating with the host vehicle V.

The traffic signal recognition device that recognizes the traffic signal in front of the host vehicle V is configured using the camera 2a, the map database 4, the vehicle position recognition unit 11, the external situation recognition unit 12, the recognition zone setting unit 15, the occluded situation determination unit 16, and the traffic signal recognition unit 17. That is, the autonomous driving system 100 includes a traffic signal recognition device that recognizes the traffic signal in front of the host vehicle V.

The vehicle position recognition snit 11 recognizes the position of the host vehicle V on the map based on the information on the position from the GPS receiver 1 and the map information in the map database 4. In addition, the vehicle position recognition unit 11 recognizes the position of the host vehicle V by the simultaneous localization and mapping (SLAM) technology using the information on the position of the fixed obstacles such as electric poles included in the map information in the map database 4 and the result of detection performed by the external sensor 2. The vehicle position recognition unit 11 may recognize the position of the vehicle on the map using known other methods.

The external situation recognition unit 12 recognizes the road situations of the surroundings of the host vehicle V. The external situation recognition unit 12 recognizes a position of the obstacle relative to the host vehicle V (the direction of the obstacle relative to the host vehicle V and the relative distance between the host vehicle V and the obstacle) and a relative speed between the host vehicle V and the obstacle based on the result of detection performed by the external sensor 2. The external situation recognition unit 12 recognizes a lane line (a lane boundary line) of a traveling lane of the host vehicle V and the adjacent lane based on, for example, the information on the image captured by the camera 2a of the external sensor 2. The external situation recognition unit 12 may recognize types of the line (continuous line, broken line, and the like) of the lane line based on the information on the image captured by the camera 2a. The external situation recognition unit 12 recognizes the traveling lane in which the host vehicle V travels based on, for example, the result of recognition of the lane line. The obstacles recognized by the external situation recognition unit 12 include moving obstacles such as pedestrians, bicycles, and surrounding vehicles that move around the host vehicle V. In addition, the obstacles include fixed obstacles such as guard rails and buildings.

In addition, the external situation recognition unit 12 recognizes a size of the surrounding vehicle in addition to the position of the surrounding vehicle relative to the host vehicle V. The external situation recognition unit 12 recognizes the size of the surrounding vehicle using a known method based on the result of measurement performed by the external sensor 2. Here, the external situation recognition unit 12 recognizes a width (a lateral width), a height, and an overall length of the surrounding vehicle as the size of the surrounding vehicle.

First, a case where the external situation recognition unit 12 recognizes the size of the surrounding vehicle V1 traveling in front of the host vehicle V from the image captured by the camera 2a will be described. As illustrated in FIG. 2A, a rear portion of the surrounding vehicle V1 is projected in the image captured by the camera 2a. For example, when recognizing the size of the surrounding vehicle V1 traveling in front of the host vehicle V, the external situation recognition unit 12 recognizes the width W and the height H of the surrounding vehicle V1 based on the captured image. It is difficult for the external situation recognition unit 12 to directly recognize the overall length L of the surrounding vehicle V1 from the captured image. Therefore, the external situation recognition unit 12 estimates types of the surrounding vehicle V1 (types such as a passenger car, a large truck, or the like) based on the recognized width W and the height H of the surrounding vehicle V1. The external situation recognition unit 12 may estimate the types of the surrounding vehicle V1 from features such as a shape of the surrounding vehicle V1 included in the captured image. Here, the external situation recognition unit 12 stores representative values of the overall lengths L of the vehicles in advance for each type of vehicles. As an example, in a case of a passenger car, the external situation recognition unit 12 stores 4 m as a representative value of the overall length L. As an example, in a case of a large truck, the external situation recognition unit 12 stores 12 m as a representative value of the overall length L. The external situation recognition unit 12 selects a representative value of the overall length L corresponding to the recognized type of the surrounding vehicle V1 from the representative value of the overall length L for each type of vehicle stored in advance. The external situation recognition unit 12 adopts the representative value of the selected overall length L as the overall length L of the surrounding vehicle V1 traveling in front of the host vehicle V.

Next, a case where the external situation recognition unit 12 recognizes the size of the surrounding vehicle V1 traveling along the side of the host vehicle V from the image captured by the camera 2a will be described. As illustrated in FIG. 2B, a side portion of the surrounding vehicle V1 is projected in the image captured by the camera 2a. For example, when recognizing the size of the surrounding vehicle V1 traveling along the side of the host vehicle V, the external situation recognition unit 12 recognizes the overall length L and height H of the surrounding vehicle V1 based on the captured image. It is difficult for the external situation recognition unit 12 to directly recognize the width W of the surrounding vehicle V1 from the captured image. Therefore, the external situation recognition unit 12 estimates types of the surrounding vehicle V1 as described above. Here, the external situation recognition unit 12 stores representative values of the width W of the vehicles in advance for each type of vehicles. The external situation recognition unit 12 selects a representative value of the width W corresponding to the recognized type of the surrounding vehicle V1 from the representative value of the width W for each type of vehicle stored in advance. The external situation recognition unit 12 adopts the representative value of the selected width W as the width W of the surrounding vehicle V1 traveling along the side of the host vehicle V.

Figure 3A:
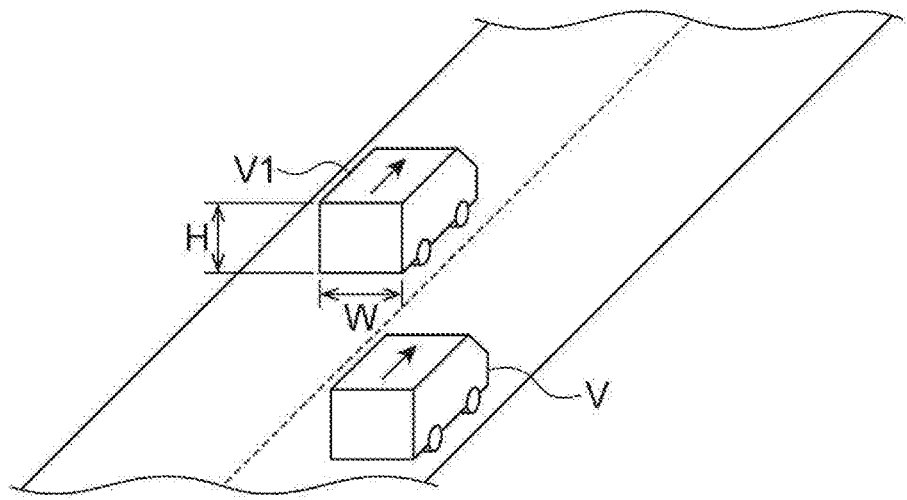
FIG. 3A is a diagram illustrating a state of a surrounding vehicle traveling obliquely in front of the host vehicle.
Figure 3B:
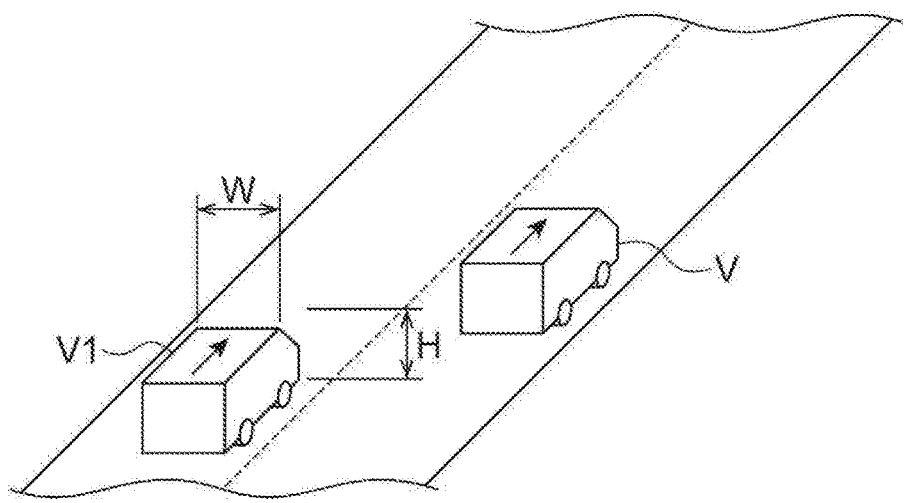
FIG. 3B is a diagram illustrating a state of a surrounding vehicle traveling obliquely behind the host vehicle.
Figure 3C:
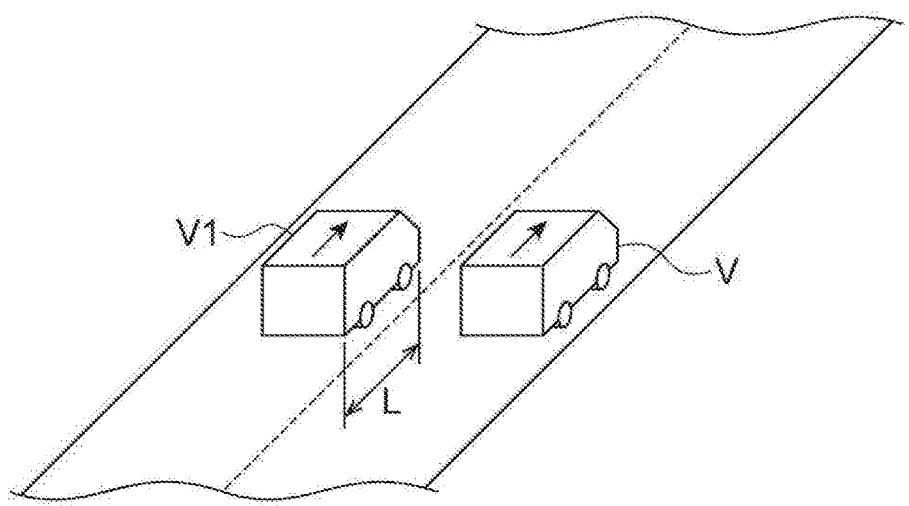
FIG. 3C is a diagram illustrating a state of a surrounding vehicle traveling on the side of the host vehicle.

In addition, the external situation recognition unit 12 may recognize at least any of the width, height, and the overall length of the surrounding vehicle respectively from a plurality of images captured at different tunings each other, and may recognize the size (width, height, and overall length) of the surrounding vehicle by combining the results of recognition. For example, when the surrounding vehicle V1 is traveling obliquely in front of or obliquely behind the host vehicle V as illustrated in FIG. 3A or FIG. 3B, the external situation recognition unit 12 recognizes the width W and the height H of the surrounding vehicle V1 based on the image captured by the camera 2a. The external situation recognition unit 12 recognizes the overall length L of the surrounding vehicle V1 based on the image captured by the camera 2a when the surrounding vehicle V1 is traveling along the side of the surrounding vehicle V1 as illustrated in FIG. 3C. The external situation recognition unit 12 may recognize the size (the width, the height, and the overall length) of the surrounding vehicle V1 by combining these results of recognition.

In addition, for example, when the surrounding vehicle V1 is traveling along the side of the host vehicle V as illustrated in FIG. 3C, the height H and the overall length L of the surrounding vehicle V1 are recognized based on the image captured by the camera 2a. The external situation recognition unit 12 recognizes the width W of the surrounding vehicle V1 based on the image captured by the camera 2a when the surrounding vehicle V1 is traveling obliquely in front of or obliquely behind the host vehicle V as illustrated in FIG. 3A or FIG. 3B. The external situation recognition unit 12 may recognize the size (the width, the height, and the overall length) of the surrounding vehicle V1 by combining these results of recognition.

In addition to the image captured by the camera 2a, the external situation recognition unit 12 may recognize the size of the surrounding vehicle based on the obstacle information detected by the radar sensor of the external sensor 2. For example, the external situation recognition unit 12 may recognize the size of the surrounding vehicle by a known method based on the point group information, which is the result of detection performed by the LIDAR. Even when the point group information by the LIDAR is used, similarly to the case of using the information on the image captured by the camera 2a, the external situation recognition unit 12 may recognize the size of the surrounding vehicle using the overall length. L or the width W stored for each type of the vehicles. In addition, even when the point group information by the LIDAR is used, similarly to the case of using the information on the image captured by the camera 2a, the external situation recognition unit 12 may recognize the width, height, and the overall length of the surrounding vehicle from the point group information detected at the different timings each other, and may recognize the size (the width, the height, and the overall length) of the surrounding vehicle by combining the results of recognition.

The travel state recognition unit 13 recognizes the travel state of the host vehicle V based on the result of detection performed by the internal sensor 3. The travel state includes the vehicle speed of the host vehicle V, the acceleration of the host vehicle V, and the yaw rate of the host vehicle V. Specifically, the travel state recognition unit 13 recognizes the vehicle speed of the host vehicle V based on the vehicle speed information from the vehicle speed sensor. The travel state recognition unit 13 recognizes the acceleration of the host vehicle V based on the vehicle speed information from the accelerator sensor. The travel state recognition unit 13 recognizes the direction of the host vehicle V based on the yaw rate information from the yaw rate sensor.

The travel plan generation unit 14 generates a travel plan that can be used for executing the autonomous driving control of the host vehicle V based on a target route set by the navigation system 5, the map information in the map database 4, the road situation of the surroundings of the host vehicle V recognized by the external situation recognition unit 12, the travel state of the host vehicle V recognized by the travel state recognition unit 13, and the result of recognition of the traffic signal performed by the traffic signal recognition unit 17. The travel plan generation unit 14 starts generating the travel plan when the driver performs a start operation of the autonomous driving control. The travel plan generation unit 14 repeatedly generates the travel plan for each predetermined time. This travel plan is the travel plan from the current position of the host vehicle V to the destination set in advance where the host vehicle V arrives.

The travel plan includes a control target value for the host vehicle V in accordance with the position on the target route of the host vehicle V. The position on the target route is a position on the map in the extending direction of the target route. The position on the target route means a set vertical position set for every predetermined interval (for example, 1 m) in the extending direction of the target route. The control target value is a value of a control target of the vehicle in the travel plan. The control target value includes a target vehicle speed and a target trajectory. The target vehicle speed is a control target of the speed of the host vehicle V in the travel plan for normal use. The target trajectory is a control target value of the traveling trajectory of the host vehicle V. A target steering angle which is a control target of the steering angle of the host vehicle V is calculated from the target trajectory.

The target vehicle speed is set according to the position on the route on which the host vehicle V travels by the autonomous driving control. The route on which the vehicle travels by the autonomous driving control is a target route for autonomous driving control, which connects the destination set in advance and the current position of the host vehicle V on the map. The position on the route is a position on the map in the extending direction of the route. Specifically, the position on the route can be a set vertical position set at every predetermined interval (for example, 1 m) in the extending direction of the route. The method of setting the set vertical position is not limited to the method described above. In the travel plan for normal use, the target vehicle speed is set for every set vertical position.

Instead of the target vehicle speed, target acceleration or a target jerk may be used. In addition to the target trajectory, a target steering angle, a target steering angle speed, a target steering torque, or a target lateral position. (a position in the width direction of the target road of the host vehicle V) may be set for every set vertical position. Well-known parameters relating to the vehicle control may be added to the control target value.

For example, as a condition for generating a travel plan, a vehicle-to-vehicle distance condition, which is a condition of the vehicle-to-vehicle distance between the host vehicle V and the surrounding vehicle that travels surroundings of the host vehicle V, is set in advance. The travel plan generation unit 14 predicts a position of the surrounding vehicle that travels surroundings of the host vehicle V, and generates a travel plan in which the traveling position of the host vehicle V is adjusted so as to satisfy the predetermined vehicle-to-vehicle distance condition.

If it is determined by the occluded situation determination unit 16 that a remaining recognition zone S1 is in a traffic signal occluded situation, which will be described later, the travel plan generation unit 14 generates a new travel plan in which the situation is not determined to be a traffic signal occluded situation by the occluded situation determination unit 16. For example, the travel plan generation unit 14 generates a changed travel plan in which the vehicle-to-vehicle distance between the surrounding vehicle and the host vehicle V in the previously generated travel plan is changed. In addition, the travel plan generation unit 14 generates a changed travel plan in which a lane change is added to the previously generated travel plan. Here, the changed travel plan in which the lane change is added is a travel plan that can make the vehicle return to the lane toward the destination again (change the lane) even when the lane change is made.

When the occluded situation determination unit 16 determines whether or not the situation is a traffic signal occluded situation using a changed travel plan, the travel plan generation unit 14 generates a changed travel plan in which the vehicle-to-vehicle distance is changed or the lane change is added until the remaining recognition zone S1 in no longer determined to be in a traffic signal occluded situation. The travel plan generation unit 14 adopts (generates) a changed travel plan in which the situation is not determined to be a traffic signal occluded situation, as a new travel plan in which the situation is not determined to be a traffic signal occluded situation by the occluded situation determination unit 16. If it is determined by the occluded situation determination unit 16 that the remaining recognition zone S1 is in a traffic signal occluded situation even though the travel plan is changed (if a new travel plan cannot be generated), the travel plan generation unit 14 determines that a handover to switch a driving state of the host vehicle V from the autonomous driving to a manual driving by the driver is needed.

For example, if the remaining recognition zone S1 is in determined to be in a traffic signal occluded situation, the travel plan generation unit 14 generates a changed travel plan in which the vehicle-to-vehicle distance to the surrounding vehicle ahead is changed within the predetermined vehicle-to-vehicle distance condition. For example, the travel plan generation unit 14 generates a travel plan in which a predetermined increase portion is added to the vehicle-to-vehicle distance in the previously generated travel plan, as the changed travel plan in which the vehicle-to-vehicle distance is changed. If it is determined by the occluded situation determination unit 16 again that the situation in the changed travel plan is a traffic signal occluded situation, the travel plan generation unit 14 generates a changed travel plan in which the vehicle-to-vehicle distance is changed again within the predetermined vehicle-to-vehicle distance condition.

If the remaining recognition zone S1 is determined to be in the traffic signal occluded situation even though the vehicle-to-vehicle distance is changed within a predetermined vehicle-to-vehicle distance condition, the travel plan generation unit 14 generates a travel plan in which the lane change is added to the previously generated travel plan, as a changed travel plan. When adding the lane change to the previously generated travel plan, the travel plan generation unit 14 determines whether the lane change can be made or not based on a reference set in advance. For example, the predetermined reference for the lane change is, for example, a threshold value of a size of a free space in the lane change destination. If it is determined by the occluded situation determination unit 16 that the remaining recognition zone S1 is in a traffic signal occluded situation even though the lane change is added, the travel plan generation unit 14 determines that the handover is needed.

If the host vehicle V is traveling in a difficulty zone where it is difficult to recognize the traffic signal (light emitting portion), it is difficult for the traffic signal recognition unit 17 to recognize the traffic signal. In this case, for example, the travel plan generation unit 14 may estimate the instruction indicated by the traffic signal based on a movement of the surrounding vehicle, and may generate a travel plan based on the result of estimation. In addition, the travel plan generation unit 14 may determine that the handover is needed if the host vehicle V is traveling in the difficulty zone.

Figure 4:
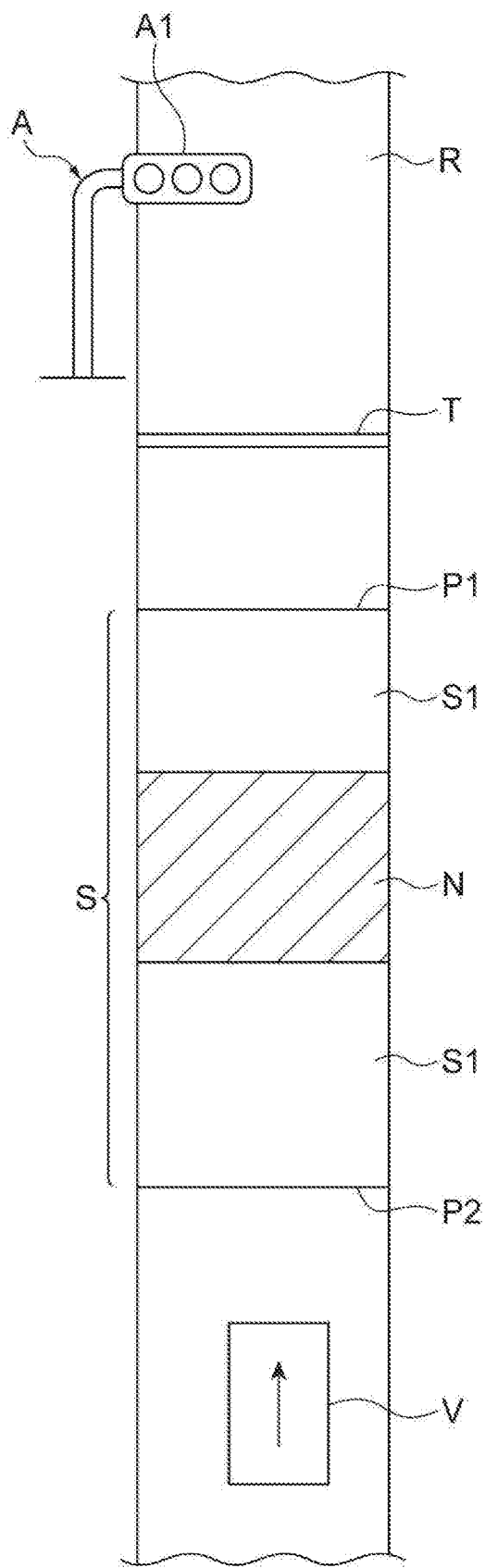
FIG. 4 is a diagram illustrating recognition zones set in front of the traffic signal.

As illustrated in FIG. 4, the recognition zone setting unit 15 sets a recognition zone S for performing the processing for recognizing a traffic signal A at the position in front of the traffic signal A on the traveling lane R of the host vehicle V. For example, the recognition zone setting unit 15 sets the recognition zone S when the distance between the host vehicle V traveling toward the traffic signal A and the traffic signal A becomes equals or shorter than a predetermined distance based on the information on the position of the host vehicle V recognized by the vehicle position recognition unit 11 and the map information stored in the map database 4. The recognition zone setting unit 15 sets a recognition start position P2 and a recognition end position P1 on the traveling lane R. A region between the recognition start position P2 and the recognition end position P1 is the recognition zone S.

First, an example of a procedure for setting the recognition end position P1 performed by the recognition zone setting unit 15 will be described. For example, when setting the recognition end position P1, the recognition zone setting unit 15 uses a set vehicle speed in the traveling lane R, a braking capability of the host vehicle V, and an allowable braking acceleration allowed at the time of braking. The recognition zone setting unit 15 acquires the set vehicle speed in the traveling lane R from the map information stored in the map database 4. The braking capability of the host vehicle V and the allowable braking acceleration are set in advance. The recognition zone setting unit 15 sets a final position (a position closest to a stop line T) where the host vehicle V can stop at the stop line T within a range that does not exceed the allowable braking acceleration when traveling at the set vehicle speed, as the recognition end position P1 based on the set vehicle speed and the like described above.

Next, an example of a procedure for setting the recognition start position P2 performed by the recognition zone setting unit 15 will be described. For example, when setting the recognition start position P2, the recognition zone setting unit 15 uses the set vehicle speed in the traveling lane R and a display transition time which is a time required for the display of the traffic signal A to transition from "traveling possible" to a display that means "stop". The display transition time is for example, a time required for the traffic signal A to transition from a green signal to a red signal. The display transition time may be a predetermined period of time, or may be included in the map information if it differs from one traffic signal to another. The recognition zone setting unit 15 sets a position in front of the stop line T as much as the traveling distance when the host vehicle V travels during the display transition time at the set vehicle speed, as the recognition start position P2.

The recognition zone setting unit 15 may set the recognition end position P1 and the recognition start position P2 based on other methods. For example, the recognition zone setting unit 15 may set a position in front of the stop line T as much as a distance set in advance as the recognition end position P1. In addition, the recognition zone setting unit 15 may set a position in front of the stop line T or the recognition end position P1 as much as a distance set in advance, as the recognition start position P2.

The occluded situation determination unit 16 sets a zone other than the difficulty zone N in the recognition zone S. Hereinafter, the zone other than the difficulty zone N in the recognition zone S will be referred to as the "remaining recognition zone S1", For example, as illustrated in FIG. 4, the occluded situation determination unit 16 excludes the difficulty zone N from the recognition zone S, and then, sets a remaining region as the remaining recognition zone S1. With regard to the difficulty zone N where it is difficult to recognize the traffic signal due to the backlight or forward light, the occluded situation determination unit 16 excludes the difficulty zone N from the recognition zone S in consideration of the current time.

In addition, the occluded situation determination unit 16 determines whether or not the remaining recognition zone S1 is in the traffic signal occluded situation, in which the line of sight from the camera 2a to the light emitting portion A1 of the traffic signal A is blocked by the surrounding vehicle when the host vehicle V travels in the remaining recognition zone S1. In other words, the occluded situation determination unit 16 performs the processing for determining whether or not the remaining recognition zone S1 is in the traffic signal occluded situation for the remaining recognition zone S1, but not for the difficulty zone N. The occluded situation determination unit 16 performs this determination before the host vehicle V reaches the recognition start position P2. However, the processing for determining whether or not the remaining recognition zone S1 is in the traffic signal occluded situation may be performed while traveling within the remaining recognition zone S1 after the host vehicle reaches the recognition start position P2.

Specifically, the occluded situation determination unit 16 predicts whether or not the line of sight from the camera 2a to the traffic signal A is blocked by the surrounding vehicle when the host vehicle V travels within the remaining recognition zone S1 based on the installed position of the traffic signal A (the installed position and the height of the light emitting portion A1) and the size and position of the surrounding vehicle recognized by the external situation recognition unit 12. The occluded situation determination unit 16 acquires the installed position of the traffic signal A from the map information stored in the map database 4. If it is predicted that the line of sight from the camera 2a to the traffic signal A is blocked by the surrounding vehicle, the occluded situation determination unit 16 determines that the remaining recognition zone S1 is in the traffic signal occluded situation.

In addition, the occluded situation determination unit 16 uses the position when the host vehicle V travels based on the travel plan generated by the travel plan generation unit 14 as the position of the host vehicle V when the host vehicle V travels within the remaining recognition zone S1. The occluded situation determination unit 16 predicts whether or not the line of sight to the traffic signal A of the light emitting portion A1 is blocked by the surrounding vehicle when the host vehicle V travels based on the travel plan.

Furthermore, the occluded situation determination unit 16 uses the position predicted based on the position of the surrounding vehicle recognized by the external situation recognition unit 12 and the like as the position when the surrounding vehicle travels within the remaining recognition zone S1. For example, when the surrounding vehicle travels in the remaining recognition zone S1, the occluded situation determination unit 16 may predict whether the surrounding vehicle travels in front of the host vehicle V or travels behind the host vehicle V from the vehicle speed and acceleration in the traveling direction of the surrounding vehicle. For example, the occluded situation determination unit 16 may predict whether or not the surrounding vehicle will perform a lane change based on the acceleration in the lateral direction (vehicle width direction) of the surrounding vehicle, and then, may predict whether or not the surrounding vehicle traveling along the side of the host vehicle V is positioned in front of the host vehicle V in the remaining recognition zone S1. The occluded situation determination unit 16 may use the position of the surrounding vehicle predicted by the travel plan generation unit 14.

The occluded situation determination unit 16 predicts whether or not the line of sight to the traffic signal A is blocked by the surrounding vehicle in each traveling position within the remaining recognition zone S1 when the host vehicle V travels from the recognition start position P2 to the recognition end position P1 based on travel plan. Here, each traveling position when the host vehicle V travels within the remaining recognition zone S1 may be positions at each predetermined distance along the traveling lane. In addition, the occluded situation determination unit 16 uses a position where the surrounding vehicle is predicted to travel when the host vehicle V is traveling through each traveling position in the remaining recognition zone S1, as the position of the surrounding vehicle.

Figure 5:
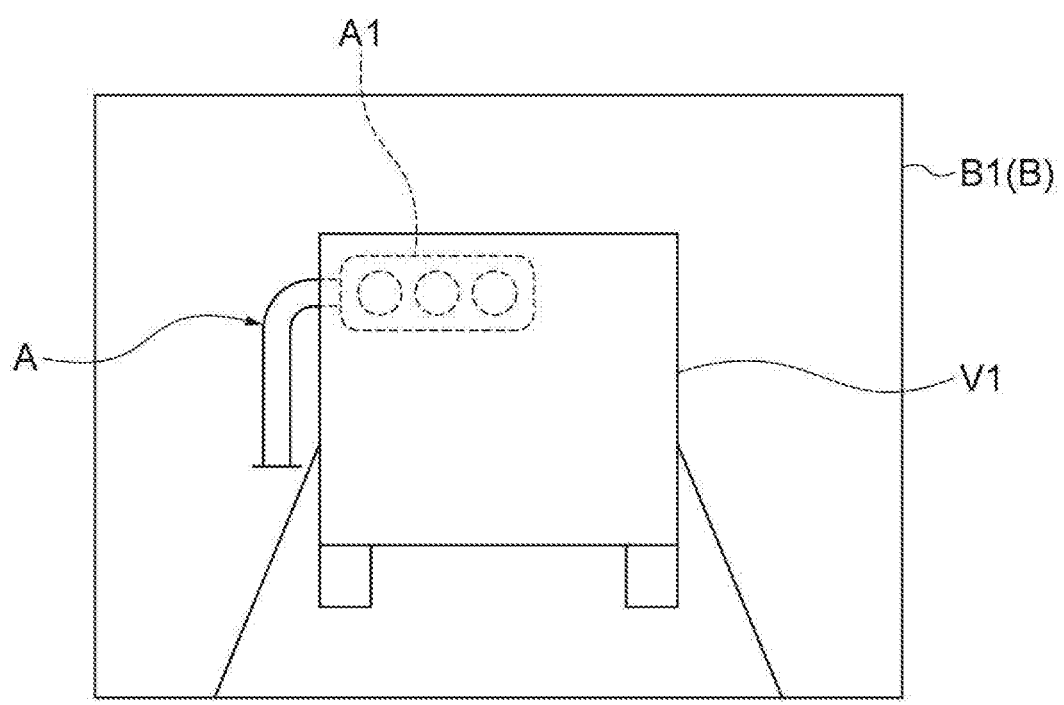
FIG. 5 is a diagram illustrating a projection image on which the traffic signal and the surrounding vehicle are projected.

Next, an example of processing for determining whether or not the remaining recognition zone S1 is in the traffic signal occluded situation performed by the occluded situation determination unit 16 will be described. First, processing for determining whether or not the image of the surrounding vehicle overlaps the image of the light emitting portion A1 of traffic signal A when the host vehicle V is traveling on a predetermined traveling position in the remaining recognition zone S1, will be described. As illustrated in FIG. 5, the occluded situation determination unit 16 generates an empty image B having the resolution same as that of the camera 2a (for example, an image buried with 0). The occluded situation determination unit 16 projects the image of the traffic signal A onto the empty image B based on the predetermined traveling position and the installed position of the traffic signal A when the host vehicle V travels within the remaining recognition zone S1. The position of the image of the traffic signal A projected on the empty image B is the position imaged by the camera 2a when the host vehicle V is traveling on the predetermined traveling position in the remaining recognition zone S1. The position of the host vehicle V in the vehicle width direction when the host vehicle V is traveling on the predetermined traveling position is obtained based on the travel plan. In the occluded situation determination unit 16, information such as an imaging range of the camera 2a in the host vehicle V is set in advance.

Next, the occluded situation determination unit 16 projects the image of the surrounding vehicle V1 onto the empty image B based on the size of the surrounding vehicle V1 recognized by the external situation recognition unit 12 and the position relative to the host vehicle V. The position of the surrounding vehicle V1 here is the position where the surrounding vehicle V1 is predicted to travel when the host vehicle V is traveling in the predetermined traveling position. The occluded situation determination unit 16 determines whether or not the image of the surrounding vehicle V1 overlaps the image of the light emitting portion A1 of the traffic signal A based on a projection image B1 in which the images of the traffic signal A and the surrounding vehicle V1 are projected onto the empty image B. The occluded situation determination unit 16 performs the processing for projecting the images of the traffic signal A and the surrounding vehicle V1 onto the empty image B to generate the projection image B1 in each traveling position within the remaining recognition zone S1 when the host vehicle travels toward the recognition end position P1 from the recognition start position P2 based on the travel plan V.

The occluded situation determination unit 16 determines whether or not the remaining recognition zone S1 is in the traffic signal occluded situation based on whether or not the image of the surrounding vehicle V1 overlaps the image of the light emitting portion A1 of the traffic signal A. For example, the occluded situation determination unit 16 generates the projection image B1 for each traveling position when the host vehicle V travels within the remaining recognition zone S1, and then, estimates the time in which the light emitting portion A1 and the surrounding vehicle V1 do not overlap each other, that is, estimates the time in which the traffic signal A can be recognized. If the time in which the traffic signal A can be recognized exceeds a threshold value set in advance, the occluded situation determination unit 16 determines that the remaining recognition zone S1 is not in the traffic signal occluded situation. In addition, if the time in which the traffic signal A can be recognized is equal to or shorter than the threshold value set in advance, the occluded situation determination unit 16 determines that the remaining recognition zone S1 is in the traffic signal occluded situation.

Not limited to the above description, for example, if the light emitting portion A1 and the surrounding vehicle V1 overlap each other even once when the projection image B1 is generated, the occluded situation determination unit 16 may determine that the remaining recognition zone S1 is in, the traffic signal occluded situation. For example, when a plurality of projection images B1 are generated, if the percentage or number of times that the light emitting portion A1 and the surrounding vehicle V1 are determined to be overlapping each other exceeds the predetermined threshold value, the occluded situation determination unit 16 may determine that the remaining recognition zone S1 is in the traffic signal occluded situation. Each of the threshold values used in this determination may be modified, for example, based on the vehicle speed of the host vehicle V, the length of the recognition zone S, and the like. Based on the result of determination obtained based on the projection image B1 whether or not the light emitting portion A1 and the surrounding vehicle V1 overlap each other, the occluded situation determination unit 16 can determine that the remaining recognition zone S1 is in the traffic signal occluded situation using various methods.

In addition, the occluded situation determination unit 16 is not limited to generate the projection images B1 for each traveling position when the host vehicle V travels within the remaining recognition zone S1 from the recognition start position P2 toward the recognition end position P1 based on the travel plan. For example, the occluded situation determination unit 16 may generate a projection image B1 only once for one traveling position when the host vehicle V travels within the remaining recognition zone S1, and may determine whether or not the remaining recognition zone S1 is in the traffic signal occluded situation based on the generated projection image B1.

If a changed travel plan is generated by the travel plan generation unit 14, the occluded situation determination unit 16 determines again whether or not, the remaining recognition zone S1 is in the traffic signal occluded situation based on the changed travel plan.

If the position of the host vehicle V recognized by the vehicle position recognition unit 11 is within the recognition zone S, the traffic signal recognition unit 17 performs processing for recognizing the traffic signal A based on the result of imaging (captured image) performed by the camera 2a. Here, as the processing for recognizing the traffic signal A, the traffic signal recognition unit 17 recognizes the instruction indicated by the light emitting portion A1 using a known technology based on the image captured by the camera 2a.

The traffic signal recognition unit 17 does not perform processing for recognizing the traffic signal A at the difficulty zone N in the recognition zone S. As described above, the traffic signal recognition unit 17 does not perform the processing for recognizing the traffic signal A when it is difficult to recognize the light emitting portion A1 of the traffic signal A due to the branches of the tree or the like. Furthermore, if it is determined by the occluded situation determination unit 16 that the remaining recognition zone S1 is in the traffic signal occluded situation, the traffic signal recognition unit 17 does not perform the processing for recognizing the traffic signal at the remaining recognition zone S1 in the recognition zone S. As described above, if the line of sight from the camera 2a to the light emitting portion A1 of the traffic signal A is blocked by the surrounding vehicle V1, the traffic signal recognition unit 17 does not perform the processing for recognizing the traffic signal A.

If the generation of a new travel plan is started b the travel plan generation unit 14, such fact is notified to the occupants of the host vehicle V by the notification unit 18. As described above, the case where the generation of a new travel plan is started by the travel plan generation unit 14 is a case where it is determined by the occluded situation determination unit 16 that the remaining recognition zone S1 is in the traffic signal occluded situation. That is, this case means the case where the travel plan is changed. The notification unit 18 notifies of a fact that there is a possibility that the travel plan may be changed using the HMI 7 through the sound or light. In addition, the notification unit 18 may perform notification by vibrating a vibration source provided on the seat on which the occupants of the host vehicle V are seated.

In addition, if the travel plan generation unit 14 determines that the handover is needed because a new travel plan cannot be generated as described above, the notification unit 18 notifies the driver of the host vehicle V via the HMI 7 to perform the handover.

The vehicle control unit 19 performs autonomous driving control of the host vehicle V based on the travel plan generated by the travel plan generation unit 14. The vehicle control unit 19 performs the autonomous driving control of the vehicle by transmitting a control signal to the actuator 6. That is, the vehicle control unit 19 causes the host vehicle V to autonomously travel based on the travel plan.

Figure 6:
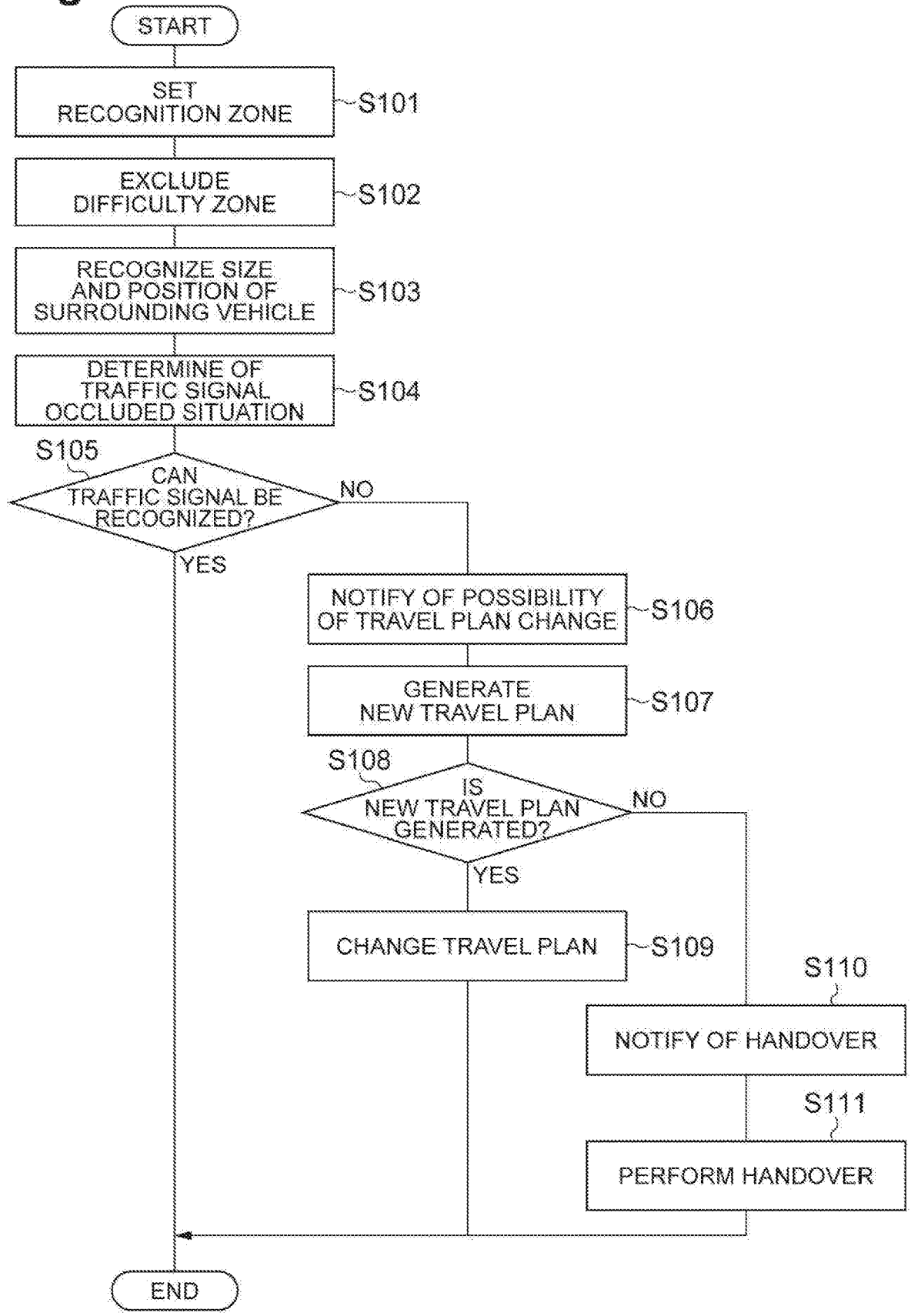
FIG. 6 is a flowchart illustrating a flow of processing for changing the travel plan performed by the autonomous driving system based on whether or not the traffic signal is blocked by the surrounding vehicle.

Next, a flow of processing for changing the travel plan performed by the autonomous driving system 100 based on whether or not the traffic signal is blocked by the surrounding vehicle will be described using a flowchart in FIG. 6. The processing illustrated in FIG. 6 is started in a state in which the autonomous driving control of the host vehicle V is being performed based on the travel plan, and when a distance between the host vehicle V traveling toward the traffic signal A and the traffic signal A is shorter than, a predetermined distance. The processing illustrated in FIG. 6 is repeatedly performed at every predetermined time.

As illustrated in FIG. 6, when the distance between the host vehicle V and the traffic signal A is shorter than the predetermined distance, the recognition zone setting unit 15 sets a recognition zone S on which the processing for recognizing the traffic signal A is to be performed (S101). Next, the occluded situation determination unit 16 excludes the difficulty zone N from the recognition zone S and sets the remaining recognition zone S1 (S102).

The external situation recognition unit 12 recognizes the size and position of the surrounding vehicle at the surroundings of the host vehicle V based on the result of detection performed by the external sensor 2 (S103). The occluded situation determination unit 16 determines whether or not the remaining recognition zone S1 is in the traffic signal occluded situation in which the line of sight from the camera 2a to the light emitting portion A1 of the traffic signal A is blocked by the surrounding vehicle (S104). If the remaining recognition zone S1 is not in the traffic signal occluded situation, that is, if the traffic signal A can be recognized (YES in S105), the autonomous driving system 100 does not perform the change of the travel plan based on whether the traffic signal A is blocked or not. The vehicle control unit 19 controls the traveling of the host vehicle V based on the travel plan originally generated by the travel plan generation unit 14. Thereafter, the autonomous driving system 100 performs the processing in S101 again.

If the remaining recognition zone S1 is in the traffic signal occluded situation, that is, if the traffic signal A cannot be recognized (NO in S105), the notification unit 18 notifies of the fact that there is a possibility that the travel plan is changed (S106). The travel plan generation unit 14 performs the processing for generating a new travel plan in which the remaining recognition zone is not determined to be in the traffic signal occluded situation by the occluded situation determination unit 16 (S107). If the new travel plan is generated by the travel plan generation unit 14 (YES in S108), the vehicle control unit 19 changes the travel plan used for the autonomous driving control to a new travel plan, and controls the traveling of the host vehicle V based on the new travel plan (S109).

On the other hand, if the new travel plan cannot be generated by the travel plan generation unit 14, that is, if it is determined by travel plan generation unit 14 that the handover is needed (NO in S108), the notification unit 18 notifies the driver of the host vehicle V through the HMI 7 to perform the handover (S110). Thereafter, the vehicle control unit 19 stops the autonomous driving control of the host vehicle V and switches the travel state of the host vehicle V to the manual driving by the driver (S111).

Next, an example of a flow of processing for recognizing the size of surrounding vehicle performed by the external situation recognition unit 12 in S103 in FIG. 6 will be described. The processing illustrated in FIG. 7 is performed for all the surrounding vehicles traveling surroundings of the host vehicle V.

Figure 7:
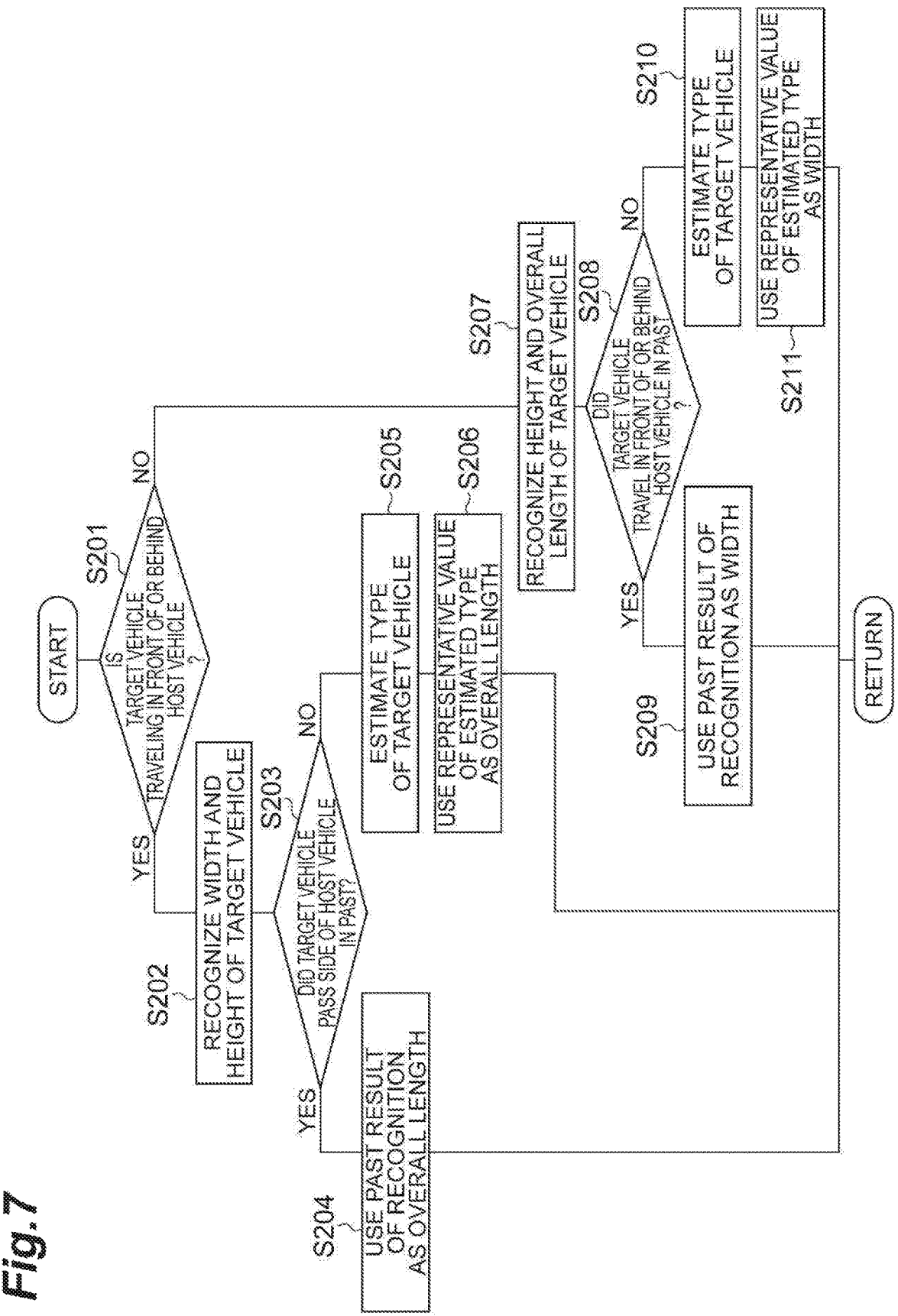
FIG. 7 is a flowchart illustrating an example of a cow of processing for recognizing the size of the surrounding vehicle performed by an external situation recognition unit.

As illustrated in FIG. 7, among the vehicles traveling surroundings of the host vehicle V, the external situation recognition unit 12 determines whether or not a size recognition target surrounding vehicle is traveling in front of or behind the host vehicle V (S201). If the recognition target surrounding vehicle is traveling in front of or behind the host vehicle V (YES in S201), the external situation recognition unit 12 recognizes a width and height of the recognition target surrounding vehicle from the image captured by the camera 2a (S202). The external situation recognition unit 12 determines whether or not the recognition target surrounding vehicle passed the side of the host vehicle V in the past (S203). The external situation recognition unit 12 can perform this determination based on, for example, the position of the surrounding vehicle recognized in the past. If the recognition target surrounding vehicle passed the side of the host vehicle V in the past (YES in S203), the external situation recognition unit 12 uses the overall length measured when the recognition target surrounding vehicle passed the host vehicle V in the past as the overall length of the recognition target surrounding vehicle (S204). The external situation recognition unit 12 recognizes the size (the width, height, and the overall length) of the recognition target surrounding vehicle traveling in front of or behind the host vehicle V by combining those results of recognition.

The external situation recognition unit 12 recognizes the overall length of the surrounding vehicle based on the image captured by the camera 2a when the surrounding vehicle passes the side of the host vehicle V, and stores the recognized overall length in association with the recognition target surrounding vehicle. Similarly, the external situation recognition unit 12 recognizes the width and height of the surrounding vehicle based on the image captured by the camera 2a when the surrounding vehicle is traveling in front of or behind the host vehicle V, and stores the recognized width and height in association with the recognition target surrounding vehicle. The external situation recognition unit 12 can use the overall length or the width and height of the stored surrounding vehicle as a past result of recognition.

If the recognition target surrounding vehicle did not pass the side of the host vehicle V in the past (NO in S203), the external situation recognition unit 12 estimates the type of the recognition target surrounding vehicle based on the image captured by the camera 2a (S205). The external situation recognition unit 12 selects a representative value of the overall length corresponding to the type of the recognized surrounding vehicle from the representative values of the overall length for each type of vehicle stored in advance. The external situation recognition unit 12 uses the selected representative value of the overall length as the overall length of the recognition target surrounding vehicle (S206). The external situation recognition unit 12 recognizes the size (the width, height, and the overall length) of the recognition target surrounding vehicle traveling in front of or behind the host vehicle V by combining those results of recognition.

On the other hand, if the recognition target surrounding vehicle is not traveling in front of or behind the host vehicle V (YES in S201), that is, if the surrounding vehicle is traveling along the side of the host vehicle V, the external situation recognition unit 12 recognizes the height and overall length of the recognition target surrounding vehicle from the image captured by the camera 2a (S207). The external situation recognition unit 12 determines whether or not the recognition target surrounding vehicle traveled in front of or behind the host vehicle V in the past (S208). The external situation recognition unit 12 can perform the determination based on, for example, the position of the surrounding vehicle recognized in the past. If the recognition target surrounding vehicle traveled in front of or behind the host vehicle V in the past (YES in S208), the external situation recognition unit 12 uses the width detected when the recognition target surrounding vehicle is traveling in front of or behind the host vehicle V in the past as the width of the recognition target surrounding vehicle (S209). The external situation recognition unit 12 recognizes the size (the width, height, and the overall length) of the recognition target surrounding vehicle traveling along the side of the host vehicle V by combining those results of recognition.

If the recognition target surrounding vehicle did not travel in front of or behind the host vehicle V in the past. (NO in S208), the external situation recognition unit 12 estimates the type of the recognition target surrounding vehicle based on the image captured by the camera 2a (S210). The external situation recognition unit 12 selects a representative value of the width corresponding to the type of the recognized surrounding vehicle from the representative values of the width for each type of vehicle stored in advance. The external situation recognition unit 12 uses the representative value of the selected width as the width of the recognition target surrounding vehicle (S211). The external situation recognition unit 12 recognizes the size (the width, height, and the overall length) of the recognition target surrounding vehicle traveling along the side of the host vehicle V by combining those results of recognition.

Next, an example of a flow of processing for determining whether or not the remaining recognition zone is in the traffic signal occluded situation performed by the occluded situation determination unit 16 will be described. The processing is performed in S104 in FIG. 6. In addition, the processing is performed after the changed travel plan is generated by the travel plan generation unit 14 (S403 and S407 in FIG. 9).

Figure 8:
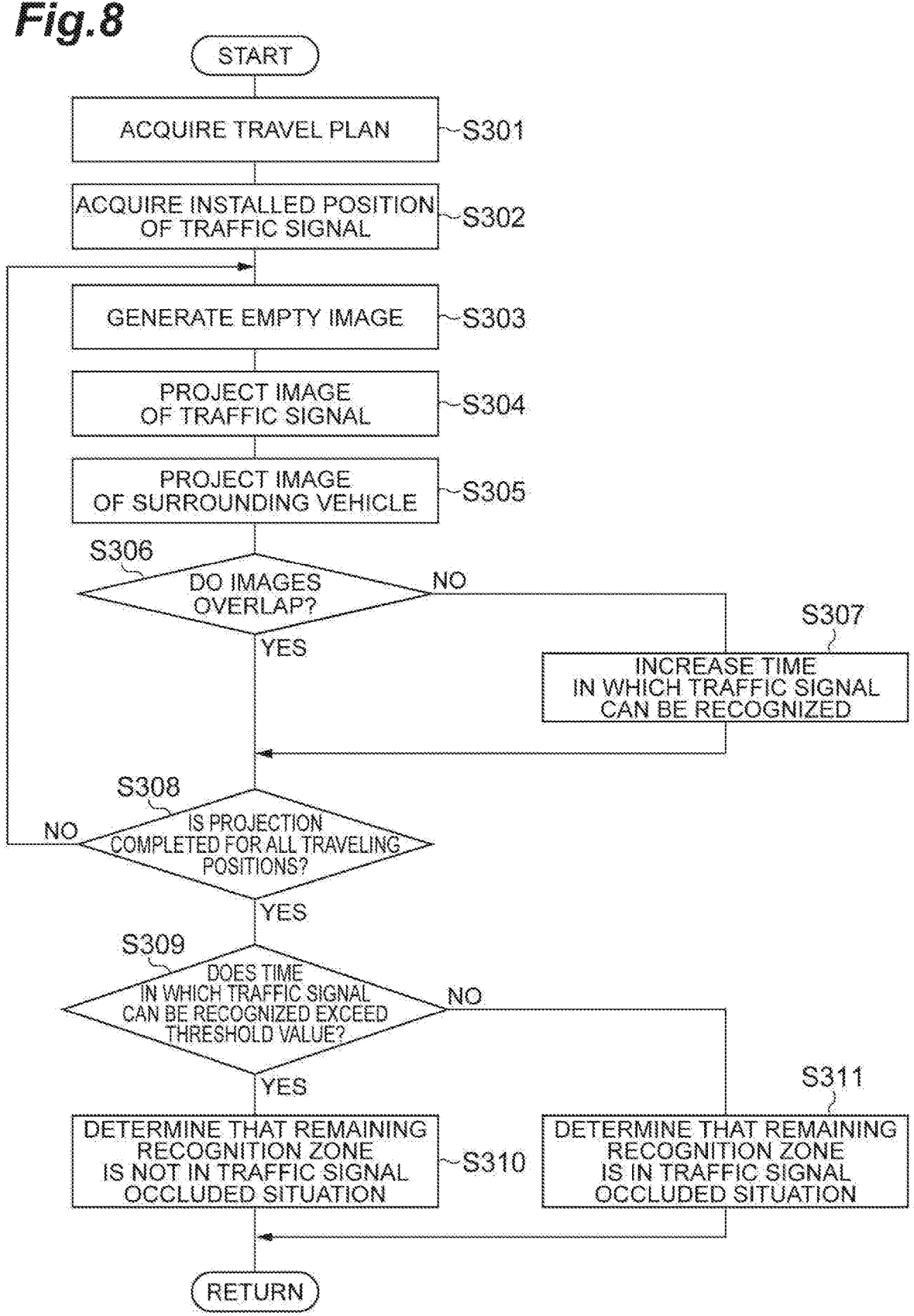
FIG. 8 is a flowchart illustrating an example of a flow of processing for determining performed by a occluded situation determination unit whether or not an situation is a traffic signal occluded situation.

As illustrated in FIG. 8, the occluded situation determination unit 16 acquires the travel plan generated by the travel plan generation unit 14 (S301). The occluded situation determination unit 16 acquires the changed travel plan when the changed travel plan is generated by the travel plan generation unit 14. The occluded situation determination unit 16 acquires the installed position of the traffic signal A (S302). Hereinafter, the occluded situation determination unit 16 respectively performs the processing items of S303 to S308 on each of the traveling positions in the remaining recognition zone S1 when the host vehicle V travels from the recognition start position P2 toward the recognition end position P1 based on the travel plan.

Specifically, the occluded situation determination unit 16 generates an empty image B illustrated in FIG. 5 (S303). The occluded situation determination unit 16 projects the image of the traffic signal A onto the empty image B based on the predetermined traveling position and the installed position of the traffic signal A when the host vehicle V travels within the remaining recognition zone S1 (S304). The occluded situation determination unit 16 projects the image of the surrounding vehicle V1 onto the empty image B based on the size and position of the surrounding vehicle V1 when the host vehicle V is traveling the predetermined traveling position (S305). The occluded situation determination unit 16 determines whether or not the image of the surrounding vehicle V1 overlaps the image of the light emitting portion A1 of the traffic signal A (S306). If the images do not overlap each other (NO in S306), the occluded situation determination unit 16 increases the time in which the traffic signal A can be recognized (S307).

If the images overlap each other (YES in S306) or after the processing in S307, the occluded situation determination unit 16 determines whether or not the projection of the traffic signal A and the surrounding vehicle V1 is completed for all the traveling positions in the remaining recognition zone S1 (S308). If the projection is not completed for all the traveling positions (NO in S308), the occluded situation determination unit 16 performs the processing items in S303 to S307 described above for the traveling positions for which the projection is not performed.

If the projection is completed for all the traveling positions (YES in S308), the occluded situation determination unit 16 determines whether or not the time in which the traffic signal A can be recognized exceeds the predetermined threshold value (S309). If the time in which the traffic signal A can be recognized exceeds the predetermined threshold value (YES in S309), the occluded situation determination unit 16 determines that the remaining recognition zone S1 is not in the traffic signal occluded situation (S310). If the time in which the traffic signal A can be recognized does not exceed the predetermined threshold value (NO in S309), the occluded situation determination unit 16 determines that the remaining recognition zone S1 is in the traffic signal occluded situation (S311).

Figure 9:
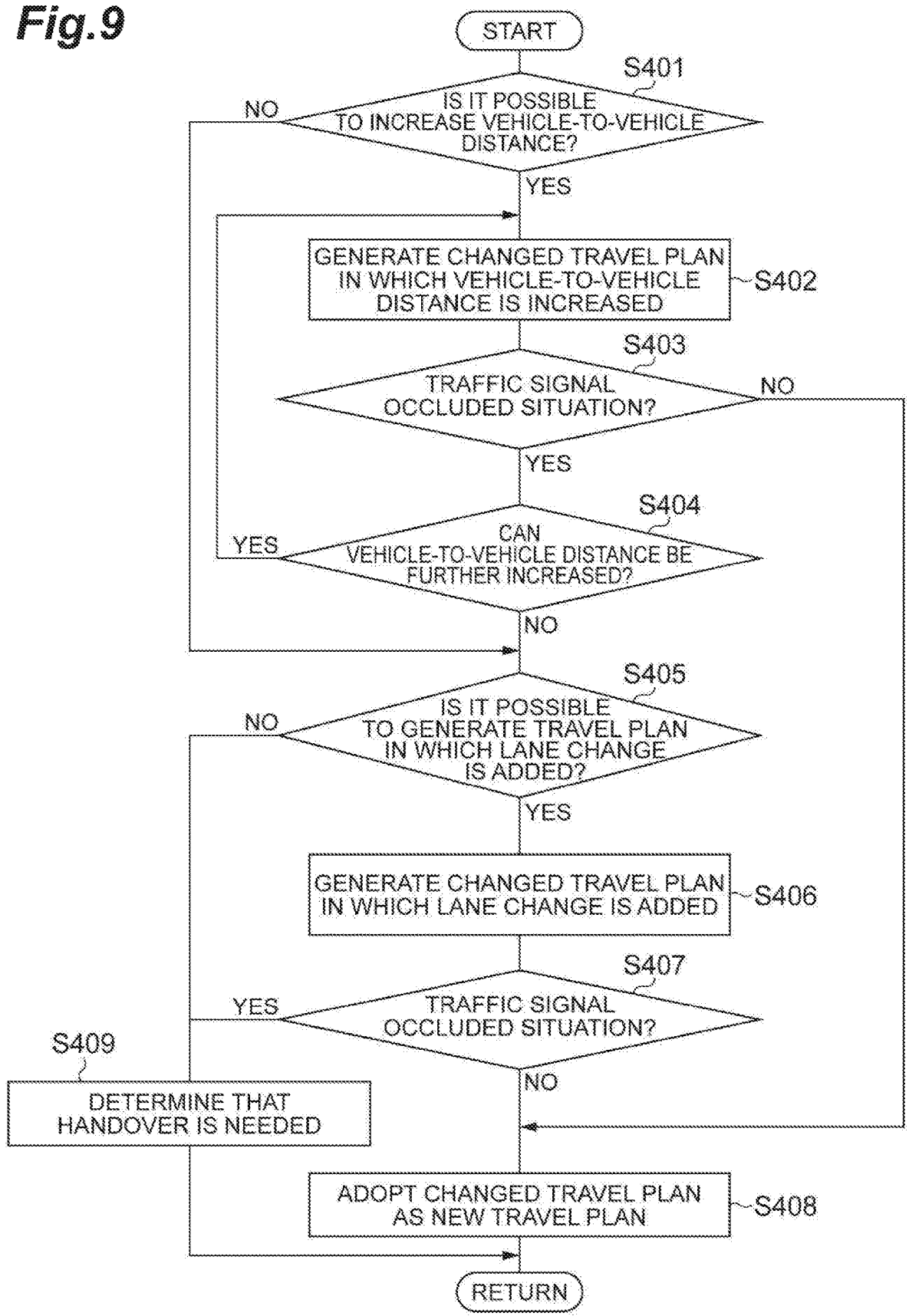
FIG. 9 is a flowchart illustrating an example of a flow of processing for generating a new travel plan performed by a travel plan generation unit.

Next, an example of a flow of processing for generating a new travel plan performed by the travel plan generation unit 14 in S107 in FIG. 6 will be described. As illustrated in FIG. 9, the travel plan generation unit 14 determines whether or not it is possible to increase the vehicle-to-vehicle distance to the surrounding vehicle ahead as much as a predetermined distance within a vehicle-to-vehicle distance condition set in advance in the previously generated travel plan (S401). If the vehicle-to-vehicle distance condition is not satisfied when the vehicle-to-vehicle distance is increased as much as the predetermined distance (NO in S401), the travel plan generation unit 14 performs the processing in S405.

If it is possible to increase the vehicle-to-vehicle distance as much as the predetermined distance within a vehicle-to-vehicle distance condition set in advance (YES in S401), the travel plan generation unit 14 generates a changed travel plan in which the vehicle-to-vehicle distance to the surrounding vehicle ahead is increased as much as the predetermined distance from the previously generated travel plan (S402). The occluded situation determination unit 16 determines whether or not the remaining recognition zone S1 is in the traffic signal occluded situation as described above based on the changed travel plan generated in S402 (S403). If the remaining recognition zone S1 is not in the traffic signal occluded situation (NO in S403), the travel plan generation unit 14 adopts the changed travel plan generated in S402 as a new travel plan (S408).

If the remaining recognition zone S1 is in the traffic signal occluded situation (YES in S403), the travel plan generation unit 14 determines whether or not it is possible to further increase the vehicle-to-vehicle distance to the surrounding vehicle ahead as much as the predetermined distance within the vehicle-to-vehicle distance condition set in advance in the previously generated travel plan (S404). If it is possible to further increase the vehicle-to-vehicle distance (YES in S404), the travel plan generation unit 14 generates a changed travel plan in which the vehicle-to-vehicle distance to the surrounding vehicle ahead is further increased as much as the predetermined distance from the previously generated changed travel plan (S402). Then, the occluded situation determination unit 16 determines whether or not the remaining recognition zone is in the traffic signal occluded situation based on the changed travel plan in which the vehicle-to-vehicle distance is further changed (S403).

If it is not possible to further increase the vehicle-to-vehicle distance to the surrounding vehicle ahead as much as the predetermined distance within the predetermined vehicle-to-vehicle distance condition (NO in S404), the travel plan generation unit 14 determines whether or not it is possible to generate a travel plan in which a lane change is added to the previously generated travel plan (S405). If it is possible to generate the travel plan in which the lane change is added (YES in S405), the travel plan generation unit 14 generates a changed travel plan in which the lane change is added to the previously generated travel plan (S406). The occluded situation determination unit 16 determines whether or not the remaining recognition zone S1 is in the traffic signal occluded situation as described above based on the changed travel plan generated in S406 (S407). If the remaining recognition zone S1 is not in the traffic signal occluded situation (NO in S407), the travel plan generation unit 14 adopts the changed travel plan generated in S406 as a new travel plan (S408).

If it is determined in step S405 that it is not possible to generate the travel plan in which the lane change is added (NO in S405), or if it is determined in step S407 that the remaining recognition zone S1 is in the traffic signal occluded situation (YES in step S407), the travel plan generation unit 14 determines that a handover to switch the driving state of the host vehicle V from the autonomous driving to the manual driving by driver is needed (S409).

As described above, the traffic signal recognition unit 17 in the autonomous driving system 100 uses the difficulty zone N included in the map information to performs the processing for recognizing the traffic signal A in the remaining recognition zone S1 excluding the difficulty zone N from the recognition zone S. Therefore, the autonomous driving system 100 can firstly perform the processing for recognizing the traffic signal A in the remaining recognition zone S1 excluding the difficulty zone where it is difficult to recognize the traffic signal A, based on the difficulty zone N included in the map information. In addition, when performing the processing for recognizing the traffic signal A in the remaining recognition zone S1 excluding the difficulty zone N from the recognition zone S, if it is determined that the remaining recognition zone S1 is in the traffic signal occluded situation in which the traffic signal A cannot be recognized because the traffic signal A is blocked by the surrounding vehicle, the traffic signal recognition unit 17 does not perform the processing for recognizing the traffic signal A within the remaining recognition zone S1. As a result, the autonomous driving system 100 can efficiently perform the processing for recognizing the traffic signal A in the recognition zone S.

In addition, by generating a new travel plan when it is determined that the remaining recognition zone S1 is in the traffic signal occluded situation, the autonomous driving system 100 can increase the possibility of recognizing the traffic signal A performed by the camera 2a.

When the generation of the new travel plan is started by the travel plan generation unit 14, the notification unit 18 notifies of such a fact. In this case, the occupants of the host vehicle V can recognize that the travel plan may be changed.

As described above, the embodiment of the present disclosure has been described, however, the present disclosure is not limited to the embodiment described above. For example, the traffic signal recognition device is incorporated in the autonomous driving system 100 which performs the autonomous driving control of the host vehicle V, however, for, example, may be incorporated in another control device such as a driving support device that supports driving of the host vehicle V. If the traffic signal recognition device is incorporated in a device other than the autonomous driving system 100 and the travel plan is not generated, the occluded situation determination unit 16 predicts the travel state of the host vehicle V based on, for example, the current vehicle speed of the host vehicle V and the like. The occluded situation determination unit 16 may determine whether or not the line of sight from the camera 2a to the traffic signal A is blocked by the surrounding vehicle when the host vehicle V travels within the remaining recognition zone S1, based on the predicted travel state of the host vehicle V. In addition, the traffic signal recognition device is not limited to being incorporated in the autonomous driving system 100 or the like, and may be used alone as a device recognizing the traffic signal A.

The autonomous driving system 100 may not include the notification unit 18 that performs notification when the travel plan generation unit 14 starts the generation of a new travel plan. The autonomous driving system 100 may generate a new travel plan without performing the notification by the notification unit 18.

In addition, the ECU 10 of the autonomous driving system 100 may not have the function (recognition zone setting unit 15) to set the recognition zone S for performing the processing for recognizing the traffic signal A. In this case, the occluded situation determination unit 16 predicts whether or not the line of sight from the camera 2a to the traffic signal A is blocked by the surrounding vehicle when the host vehicle V travels based on the installed position of the traffic signal A and the size and position of the surrounding vehicle recognized by the external situation recognition unit 12. If it is predicted that the line of sight from the camera 2a to the traffic signal A is blocked by the surrounding vehicle, the occluded situation determination unit 16 determines that an area in front of the host vehicle is in the traffic signal occluded situation. Unlike the embodiment above, the traffic signal recognition unit 17 always performs processing for recognizing the traffic signal A based on the result of imaging (captured image) performed by the camera 2a regardless of whether or not the position of the host vehicle V is within the recognition zone S. However, the traffic signal recognition unit 17 does not perform the processing for recognizing the traffic signal A if the position of the host vehicle V is within the difficulty zone N. In addition, the traffic signal recognition unit 17 does not perform the processing for recognizing the traffic signal A if it is determined by the occluded situation determination unit 16 that the area in front of the host vehicle is in the traffic signal occluded situation. The autonomous driving system 100 can efficiently perform the processing for recognizing the traffic signal A even in this case.

What is claimed is:

1. A traffic signal recognition device that is configured to recognize a traffic signal in front of a host vehicle, comprising:
    a map database configured to store information of a map, including an installed position of the traffic signal and information on a position of a difficulty zone where it is difficult to recognize the traffic signal seen from a traveling lane;
    a camera configured to image the front of the host vehicle; and
    an electronic control unit (ECU) including a processor programmed to:
        recognize a position of the host vehicle on the map,
        perform processing for recognizing the traffic signal based on a result of imaging performed by the camera,
    recognize a size of a surrounding vehicle at the surroundings of the host vehicle and a position relative to the host vehicle,
    determine whether or not an area in front of the host vehicle is in a traffic signal occluded situation in which a line of sight from the camera to the traffic signal is blocked by the surrounding vehicle when the host vehicle travels in the area,
    predict whether or not the line of sight from the camera to the traffic signal is blocked by the surrounding vehicle when the host vehicle travels in the area in front of the host vehicle, based on the installed position of the traffic signal and the size and position of the surrounding vehicle, and determine whether or not the area in front of the host vehicle is in the traffic signal occluded situation based on the result of prediction,
        not perform the processing for recognizing the traffic signal if the position of the host vehicle is within the difficulty zone, and
        not perform the processing for recognizing the traffic signal if the area in front of the host vehicle is in the traffic signal occluded situation.

2. The traffic signal recognition device according to claim 1, wherein the ECU is further programmed to set a recognition zone on which processing for recognizing the traffic signal is to be performed, at a position in front of the traffic signal in the traveling lane,
    perform the processing for recognizing the traffic signal if the position of the host vehicle is within the recognition zone,
    determine whether or not a zone other than the difficulty zone in the recognition zone is in the traffic signal occluded situation, and not perform the processing for recognizing the traffic signal within the difficulty zone in the recognition zone, and not perform the processing for recognizing the traffic signal within the zone other than the difficulty zone in the recognition zone if the zone other than the difficulty zone is in the traffic signal occluded situation.

3. An autonomous driving system that is configured to perform an autonomous driving control of a host vehicle, comprising:

the traffic signal recognition device according to claim 2;

wherein the ECU is further programmed to generate a travel plan in the autonomous driving control; and perform the autonomous driving control of the host vehicle based on the travel plan, wherein the ECU predicts whether or not the line of sight from the camera to the traffic signal is blocked by the surrounding vehicle if the host vehicle travels based on the travel plan, and wherein the ECU generates a new travel plan in which the area in front of the host vehicle is not determined to be in the traffic signal occluded situation if it is determined that the area in front of the host vehicle is in the traffic signal occluded situation.

4. The autonomous driving system according to claim 3, wherein the ECU is further programmed to perform notification of a fact that the ECU starts to generate the new travel plan.

5. An autonomous driving system that is configured to perform an autonomous driving control of a host vehicle, comprising:

the traffic signal recognition device according to claim 1;

wherein the ECU is further programmed to:

generate a travel plan in the autonomous driving control; and perform the autonomous driving control of the host vehicle based on the travel plan, wherein the ECU predicts whether or not the line of sight from the camera to the traffic signal is blocked by the surrounding vehicle if the host vehicle travels based on the travel plan, and wherein the ECU generates a new travel plan in which the area in front of the host vehicle is not determined to be in the traffic signal occluded situation if it is determined that the area in front of the host vehicle is in the traffic signal occluded situation.

6. The autonomous driving system according to claim 5, wherein the ECU is further programmed to perform notification of a fact that the ECU starts to generate the new travel plan.

* * * * *